United States Patent
Lenna et al.

(10) Patent No.: US 12,492,221 B2
(45) Date of Patent: Dec. 9, 2025

(54) PROCESS FOR PREPARING (3α,5α)-3-HYDROXY-3-METHYL-PREGNAN-20-ONE (GANAXOLONE)

(71) Applicant: INDUSTRIALE CHIMICA S.R.L., Milan (IT)

(72) Inventors: Roberto Lenna, S. Giorgio su Legnano (IT); Andrea Fasana, Nesso (IT); Claudio Delfrate, Rho (IT); Jerry David Ortiz Blacio, Milan (IT)

(73) Assignee: Industriale Chimica S.R.L., Milan (IT)

( * ) Notice: Subject to any disclaimer, the term of this patent is extended or adjusted under 35 U.S.C. 154(b) by 488 days.

(21) Appl. No.: 18/024,612

(22) PCT Filed: Sep. 8, 2021

(86) PCT No.: PCT/IB2021/058149
§ 371 (c)(1),
(2) Date: Mar. 3, 2023

(87) PCT Pub. No.: WO2022/053937
PCT Pub. Date: Mar. 17, 2022

(65) Prior Publication Data
US 2023/0322844 A1    Oct. 12, 2023

(30) Foreign Application Priority Data
Sep. 9, 2020  (IT) .......... 102020000021316

(51) Int. Cl.
*C07J 7/00*  (2006.01)
(52) U.S. Cl.
CPC .................... *C07J 7/002* (2013.01)

(58) Field of Classification Search
CPC ................ C07J 7/002; C07J 17/00
See application file for complete search history.

(56) References Cited

FOREIGN PATENT DOCUMENTS

| EP | 2464653 A2 | 6/2012 |
|---|---|---|
| WO | 2011019821 A2 | 2/2011 |
| WO | 2016061527 A1 | 4/2016 |

OTHER PUBLICATIONS

Hogenkamp, D. J, et al., "Synthesis and in vitro Activity of 3.beta.-Substituted-3.alpha.-hydroxypregnan-20-ones: Allosteric Modulators of the GABAA Receptor", J. Med. Chem., 40(1)https://doi.org/10.1021/jm960021x, Jan. 3, 1997, 61-72.

*Primary Examiner* — Susanna Moore
(74) *Attorney, Agent, or Firm* — Elmore Patent Law Group, P.C.; Joseph C. Zucchero; Carolyn S. Elmore

(57) ABSTRACT

The present invention refers to a process for preparing (3α,5α)-hydroxy-3-methyl-pregnan-20-one, a compound also known as Ganaxolone, having the formula below: (I):

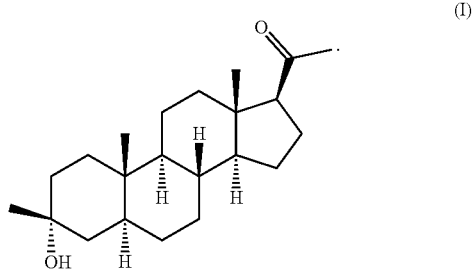

12 Claims, 5 Drawing Sheets

PROCESS FOR PREPARING (3α,5α)-3-HYDROXY-3-METHYL-PREGNAN-20-ONE (GANAXOLONE)

FIELD OF THE INVENTION

The present invention relates to the sector of processes for the synthesis of active ingredients for pharmaceutical use, and in particular to a process for preparing (3α,5α)-3-hydroxy-3-methyl-pregnan-20-one on an industrial scale.

STATE OF THE ART

The compound (3α,5α)-3-hydroxy-3-methyl-pregnan-20-one, having the structural formula below, is also known by the name Ganaxolone, which will be used in the rest of the description:

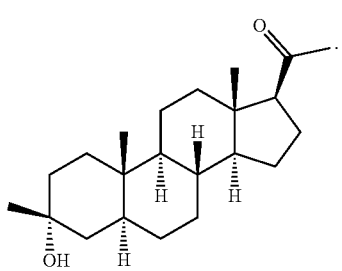

The compound is a steroid drug, structurally related to allopregnanolone, having sedative, anxiolytic and anticonvulsant effects, and is a selective modulator of GABA-A under development for various forms of epileptic disorders, even of particular severity, such as to endanger the life of the patient.

Ganaxolone is described in example 21 of U.S. Pat. No. 3,953,429 of 1974; the example describes the preparation of the compound with a 21.7% molar yield starting from 5α-pregnane-3,20-dione-20-ketal.

The synthesis of the compound is also described in scheme 1 in the article "Synthesis and in vitro activity of 3β-substituted-3α-hydroxypregnan-20-ones: allosteric modulators of the $GABA_A$ receptor", D. J. Hogenkamp et al., J. Med. Chem. 1997, 40, 1, 61-72. No indication is given in the article relating to the quality of the product obtained in relation to the presence and content of impurities; the only parameter provided attributable to purity is the melting point, that perhaps could be acceptable in the 1970s, but is not acceptable in 1997 in relation to a product with pharmaceutical activity.

EP 2464653 B1 describes a synthesis of Ganaxolone defined as "single step regioselective and stereoselective" (par. [0025] on page 5). On page 18, the patent lists a series of characteristic impurities of the process, most of which are due to the fact that the alkylation of the carbonyl in position 3 is not completely regioselective in the presence of a second carbonyl in position 20. Furthermore, the reaction work-up involves the use of strong acids and strong bases (aqueous HCl and NaOH) which, as discussed below, generate degradation of the compound with formation of by-products.

The need is therefore felt to have a process for the synthesis of Ganaxolone that overcomes the aforementioned drawbacks of known processes.

The object of the present invention is to provide a synthetic route for preparing the compound (3α,5α)-3-hydroxy-3-methyl-pregnan-20-one (Ganaxolone), that can be applied industrially and allows to obtain a product of pharmaceutical quality.

SUMMARY OF THE INVENTION

This object is achieved with the present invention, relating to a process for the synthesis of (3α,5α)-3-hydroxy-3-methyl-pregnan-20-one (Ganaxolone) following steps:

a) reaction of the compound (3β)-3-hydroxy-pregnan-20-one (Pregnanolone) with a glycol under acid catalysis conditions to obtain Pregnanolone 20,20' ketal:

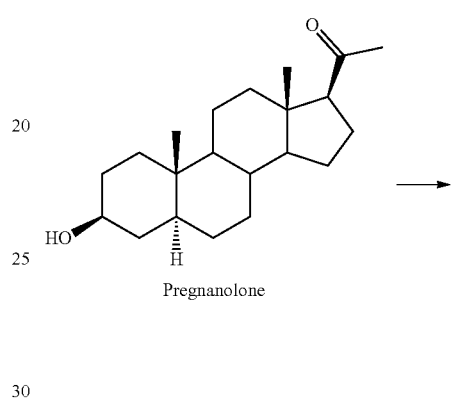

Pregnanolone

Pregnanolone 20,20' ketal b) oxidation of Pregnanolone 20,20' ketal to obtain the corresponding Pregnane-3,20-dione 20,20' ketal (Pregnanedione 20,20' ketal):

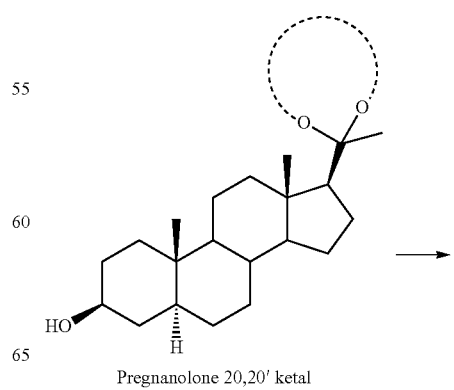

Pregnanolone 20,20' ketal

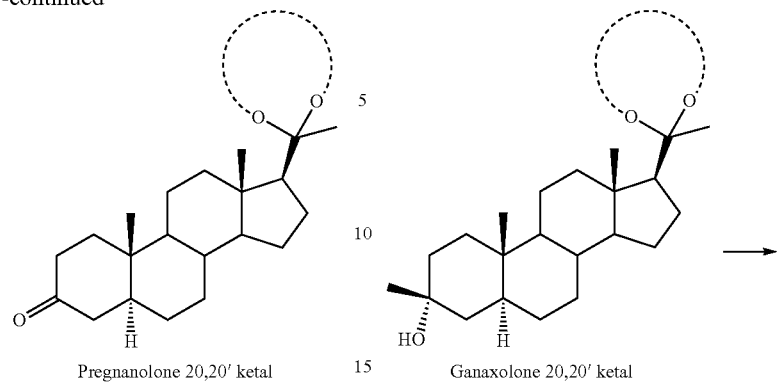

c) reaction of Pregnane-3,20-dione 20,20' ketal with a methylmagnesium halide Grignard reagent, CH₃MgX, to form (3α,5α)-3-hydroxy-3-methyl-pregnan-20-one 20,20' ketal (Ganaxolone 20,20' ketal):

wherein the reaction takes place at a temperature between −35° C. and −15° C., X denotes a halogen atom selected from chlorine and bromine, and the reaction takes place in the presence of lithium and iron(III) salts with X anion;

d) deprotection of Ganaxolone 20,20' ketal with iodine in a neutral environment to form Ganaxolone:

In a preferred embodiment of the invention, the Pregnanolone used as starting reagent in step a) is produced in a preliminary step 0) by reduction of (3β)-3-hydroxy-pregn-5-en-20-one (Pregnenolone), which is a compound with wider commercial availability:

DETAILED DESCRIPTION OF THE INVENTION

Figure 1:
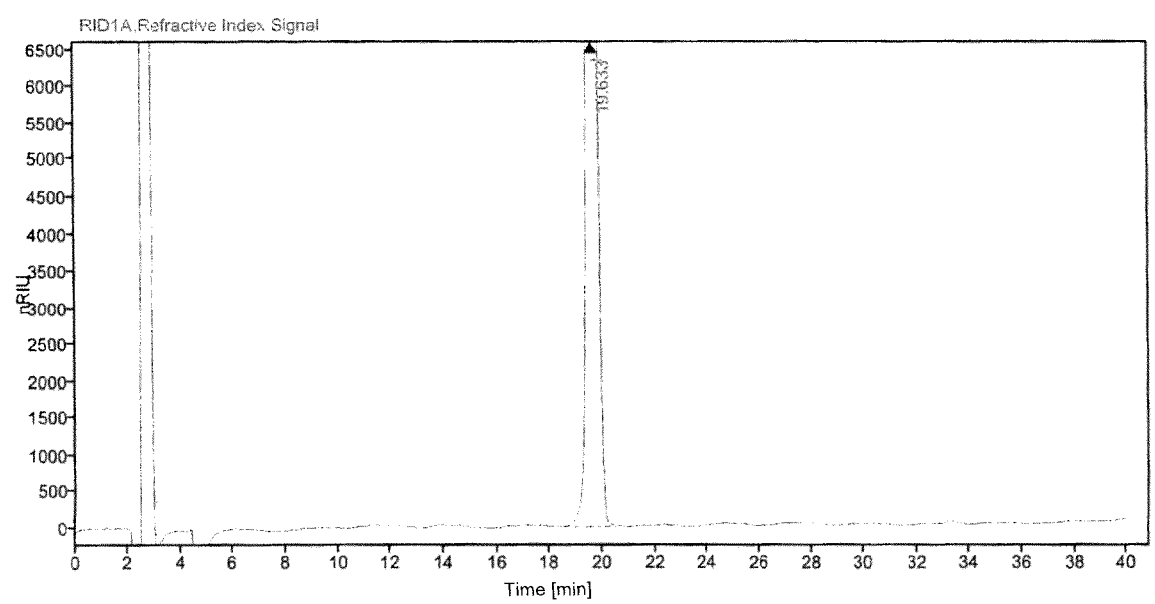
FIG. 1 shows the HPLC chromatogram of Ganaxolone obtainable by the process of the invention.
Figure 2:
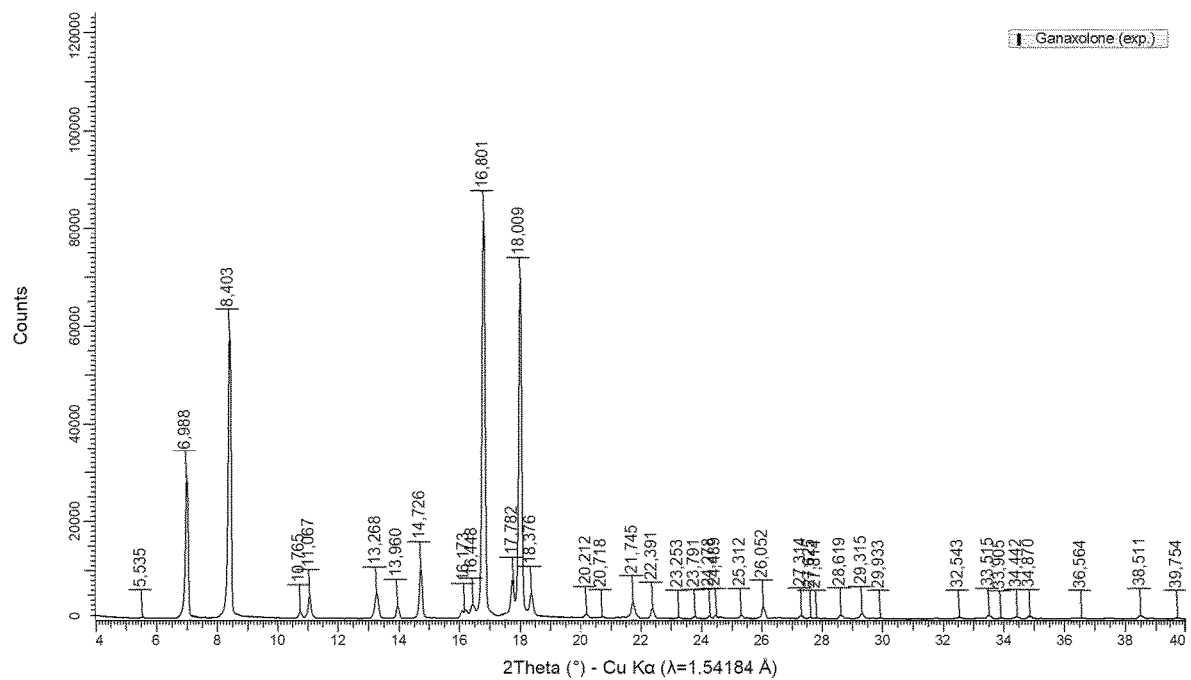
FIG. 2 shows the X-ray diffraction spectrum of Ganaxolone obtainable by the process of the invention.
Figure 3:
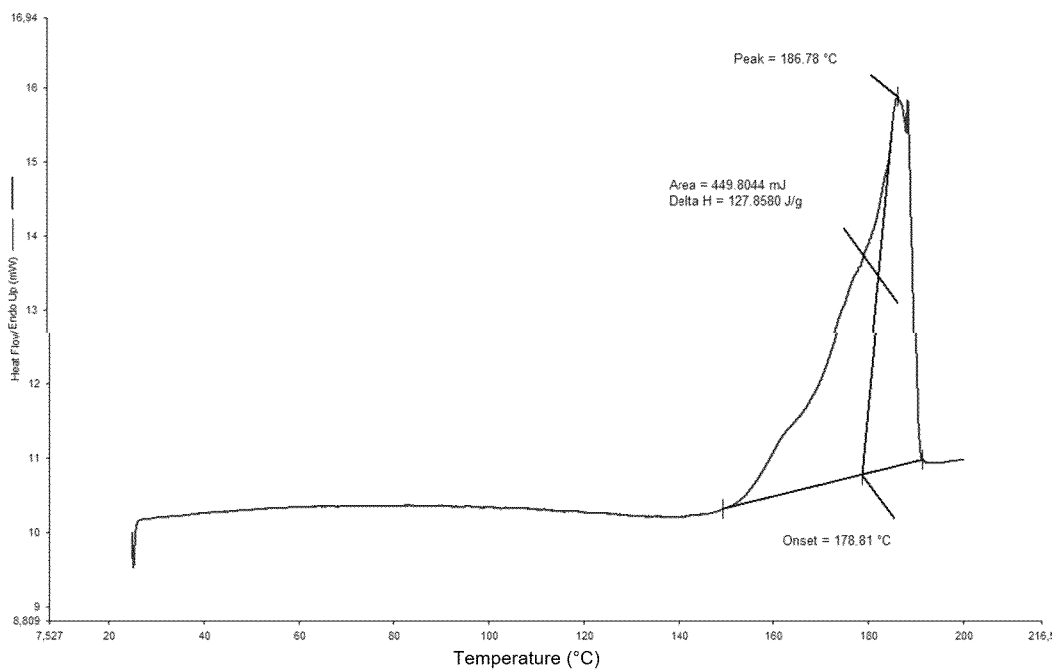
FIG. 3 shows the DSC thermogram of Ganaxolone obtainable by the process of the invention.
Figure 4:
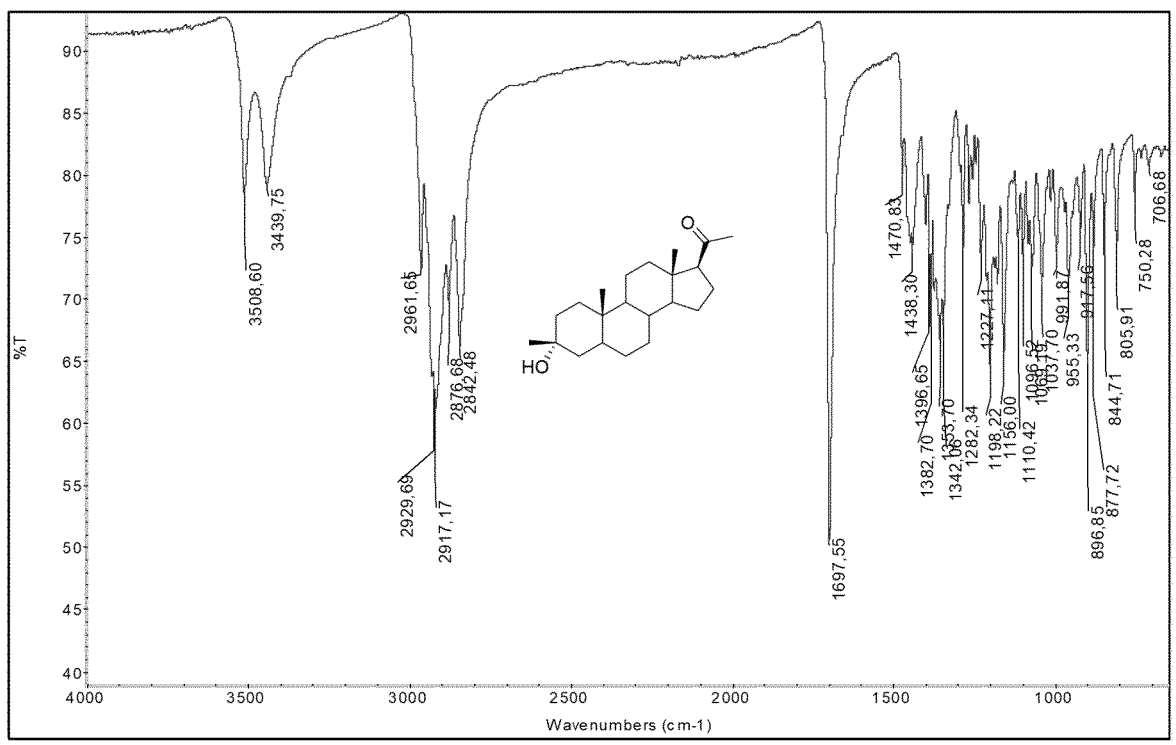
FIG. 4 shows the IR spectrum of Ganaxolone obtainable by the process of the invention.
Figure 5:
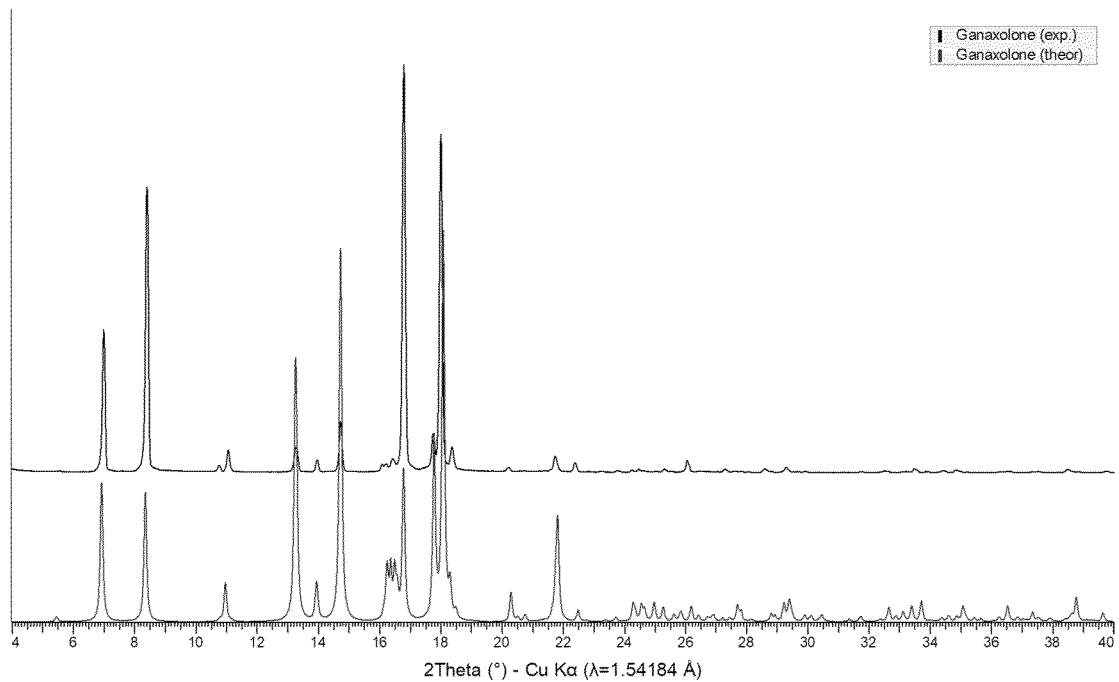
FIG. 5 shows the comparison between the X-ray diffraction spectrum of Ganaxolone obtainable by the process of the invention and that calculated using the information reported in the aforementioned article by D. J. Hogenkamp et al.

The invention relates to a process for the synthesis of Ganaxolone requiring four synthetic steps a)-d).

The first step, a), consists in the reaction of Pregnanolone with a glycol under acid catalysis conditions in order to obtain the corresponding cyclic ketal (Pregnanolone 20,20' ketal):

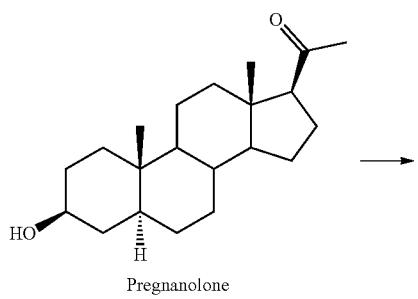
Pregnanolone

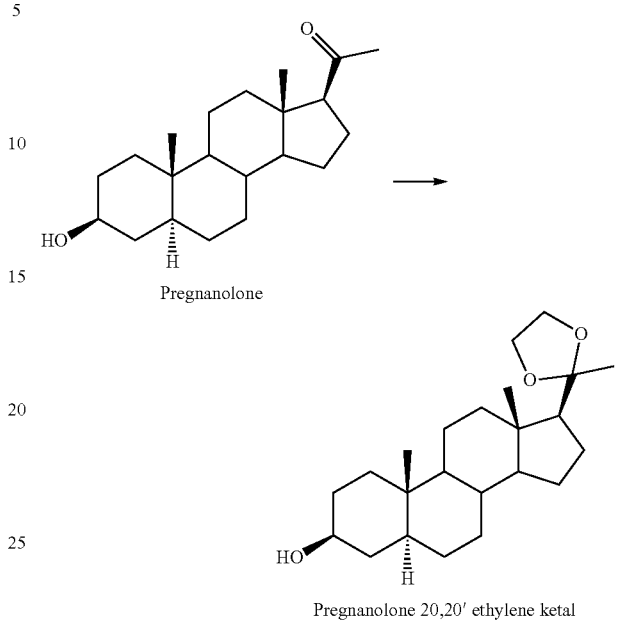
Pregnanolone

Pregnanolone 20,20' ethylene ketal

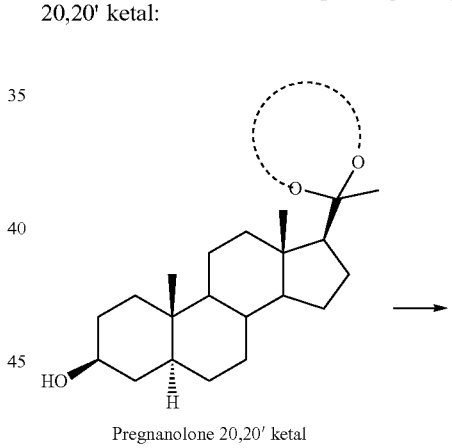
Pregnanolone 20,20' ketal

Ethylene glycol, 1,3-propylene glycol and 2,2-dimethylpropylene glycol can be used as glycols.

Hydrochloric acid, fumaric acid, oxalic acid, phthalic acid, para-toluenesulfonic acid (PTSA), pyridine hydrochloride, pyridinium tosylate (PPTS) and Amberlyst 15® (registered trademark of DuPont de Nemours Inc.) can be used as the acid catalysts; Amberlyst 15® is a highly acidic ion exchange resin due to the presence of sulphonic groups on a polystyrene base polymer.

Toluene, tetrahydrofuran (THF), methyl-tetrahydrofuran, dichloromethane, acetonitrile, chloroform, dimethoxyethane, methyl tert-butyl ether, dioxane and mixtures thereof can be used as solvent for the reaction.

The reaction is favored by the use of a dehydrating agent that eliminates the water formed, thus shifting the balance towards the ketal formation. Triethylorthoformate (TEOF), trimethylorthoformate (TMOF) and molecular sieves can be used as dehydrating agent.

Preferred conditions for carrying out this step are the use of ethylene glycol, para-toluenesulfonic acid (PTSA) as acid catalyst, and triethylorthoformate as dehydrating agent. In this case, the intermediate obtained is (3β,5α)-cyclic-1,2-ethanediylacetal-3-hydroxypregnan-20-one (Pregnanolone 20,20' ethylene ketal):

Step b) consists in the oxidation of Pregnanolone 20,20' ketal to obtain the corresponding Pregnane-3,20-dione 20,20' ketal:

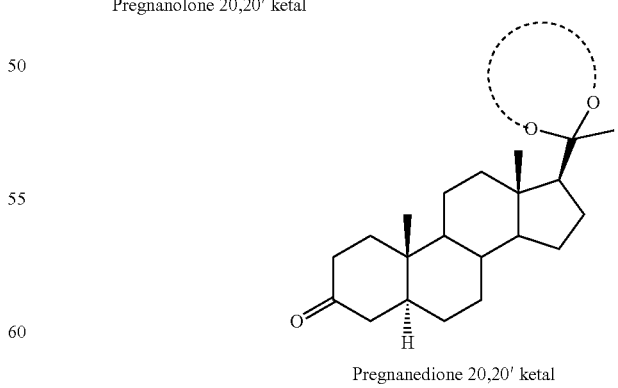
Pregnanolone 20,20' ketal

Pregnanedione 20,20' ketal

The oxidation can be achieved using: chromium(VI) compounds; a hypochlorite such as calcium or sodium hypochlorite in the presence of 2,2,6,6-tetramethylpiperidin-1-oxyl radical (known in the field as "TEMPO") or a derivative thereof, such as 4-hydroxy-2,2,6,6-tetramethylpiperidin-1-oxyl radical, 4-methoxy-2,2,6,6-tetramethylpiperidin-1-oxyl radical or 4-benzyloxy-2,2,6,6-tetramethylpiperidin-1-oxyl radical; ruthenium derivatives such as ruthenium tetroxide, ruthenium trichloride in the presence of a reoxidant, such as sodium hypochlorite, or tetrapropylammonium perruthenate in the presence of N-methylmorpholine N-oxide; potassium peroxymonosulfate $KHSO_5$ (commercially known as Oxone); 1,3,5-trichloro-2,4,6-triazinetrione; dimethylsulfoxide according to Swern's conditions; or hypervalent iodine compounds such as Dess-Martin periodinane. The oxidation reactions carried out with these reagents, as well as the conditions under which they occur, are widely known in the field of organic synthesis, and do not need a detailed description.

In the preferred case mentioned above, Pregnanolone 20,20' ethylene ketal is oxidized to obtain (5α)-cyclic-20-(1,2-ethanediyl-acetal)-Pregnane-3,20-dione. The preferred oxidation procedures for carrying out this step are those with TEMPO and a hypochlorite, oxidation according to Swern's conditions, and oxidation with hypervalent iodine compounds; the methods of carrying out these reactions are described in detail in examples 3, 6 and 7.

Step c) consists in the transformation of Pregnane-3,20-dione 20,20' ketal into Ganaxolone 20,20' ketal, by introducing the methyl group in position 3 of Pregnane-3,20-dione 20,20' ketal with the correct spatial arrangement:

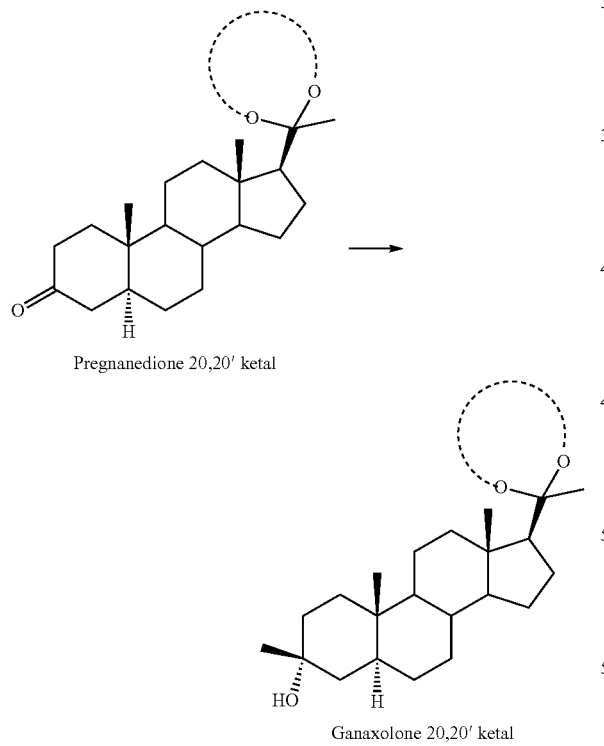

This transformation takes place by a reaction with a Grignard reagent, $CH_3MgX$, wherein X denotes a halogen atom selected from chlorine and bromine, in the presence of lithium and iron (III) salts corresponding to X anion. The molar ratio among lithium halide, iron trihalide and Grignard's reagent is 1.6/1.1/4.4.

Methylmagnesium chloride ($CH_3MgCl$) is preferably used in the presence of lithium chloride and anhydrous iron trichloride. The absence of lithium and iron (III) salts of the anion corresponding to the Grignard reagent negatively affects the outcome of the reaction (in this regard, see examples 11 and 12). The reaction is carried out at a temperature between −35° C. and −15° C. for a time between 2 and 6 hours, preferably between 3 and 5 hours. At temperatures outside the indicated range, worse results are obtained. The solvent can be selected from tetrahydrofuran (THF), ethyl ether, isopropyl ether, methyl tert-butyl ether and mixtures thereof. THF is preferably used.

The fact that the reaction with the Grignard's reagent is carried out on a substrate with only one free carbonyl moiety avoids the formation of by-products due to the presence of a second carbonyl moiety that can react.

In fact, the question does not arise as to whether said addition reaction is regioselective and to what extent regioselective it is, nor the problem of subsequent purification from the by-products obtained.

In the case of addition of the Grignard reagent to Pregnane-3,20-dione, instead, in addition to the reaction in position 3, the carbonyl in position 20 can also react or both can react, as shown in the figure below:

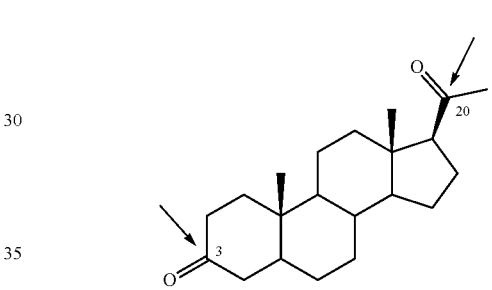

Furthermore, the obtained by-products can in turn evolve into new by-products. This possibility is described in EP 2464653 B1 and, even if the text of this document states that by-products can be eliminated with purification procedures, it is apparent that if the possibility of their formation is excluded, the problem is eliminated a priori.

Finally, step d) consists in the deprotection of the carbonyl in position 20 of Ganaxolone 20,20' ketal to form Ganaxolone:

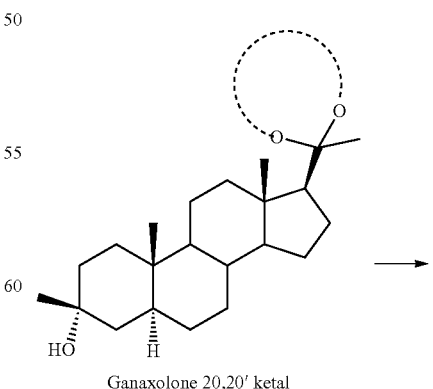

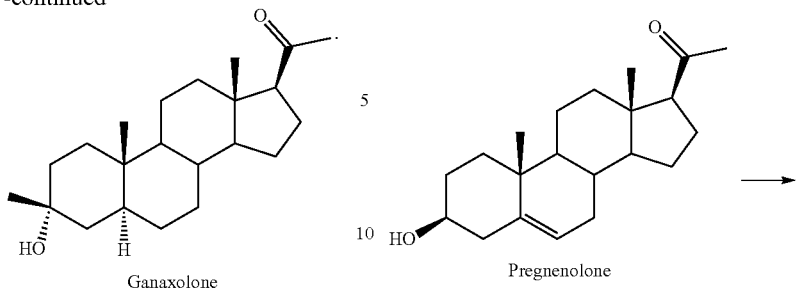

During their experimental activities, the inventors observed the epimerization of position 17 when Ganaxolone found itself in the presence of acids and bases, such as HCl and NaOH, capable of promoting the formation of an enol intermediate or an enolate intermediate:

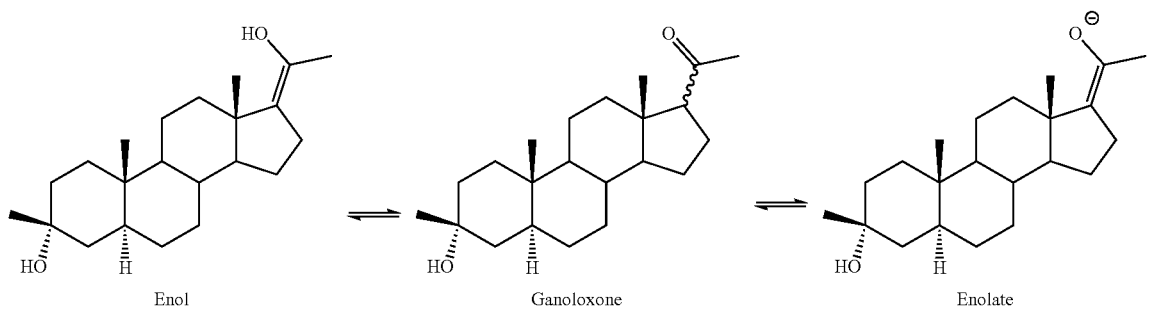 [SMILES: C/C(O)=C1\CCC2C3CC[C@H]4C[C@](C)(O)CC[C@]4(C)C3CC[C@]12C ; CC(=O)C1CCC2C3CC[C@H]4C[C@](C)(O)CC[C@]4(C)C3CC[C@]12C ; C/C([O-])=C1\CCC2C3CC[C@H]4C[C@](C)(O)CC[C@]4(C)C3CC[C@]12C]

The formation of the double bond between positions 17 and 20 generates an intermediate with a planar structure that evolves during the reaction by regenerating the mixture of the two epimers with respect to position 17. Examples 13 and 14 (comparative) reported below in the experimental section confirm the epimerization above. Ganaxolone, epimer β, is always the predominant product, but epimer α is anyway present. Eliminating or at least limiting this unwanted chemical reaction (epimerization) is relevant to both the process yield and the quality of pharmaceutical Ganaxolone.

The ketal should therefore be hydrolysed in a neutral environment, avoiding the presence of acids or bases. Iodine, in an amount of 1% by mole with respect to the substrate, is preferably used for deprotection of the ketal.

As reaction solvent, it is possible to use anhydrous acetone or a mixture of dichloromethane and acetone operating in the absence of water. Operating with anhydrous acetone or with a mixture of dichloromethane and acetone in the absence of water is crucial for the outcome of the reaction. The reaction temperature is between −5° C. and the reflux temperature of the reaction mixture; it is preferred to operate between 15 and 35° C. The reaction time is between 5 and 90 minutes. It is preferred to operate in a range of time between 10 and 45 minutes.

In a preferred embodiment of the invention, the Pregnanolone used as the starting reagent of the process of the invention is produced in an initial step 0) by reduction of (3(3)-3-hydroxy-pregn-5-en-20-one (Pregnenolone):

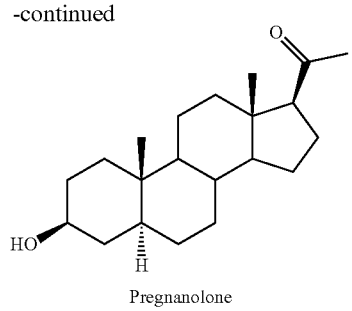

This step can be carried out following the indications reported in WO 2020/083839 A1 (example 1 on page 15). In short, the hydrogenation is carried out in organic solvent using 5% Pd/C as catalyst at a temperature between 35 and 45° C. and operating with a hydrogen pressure of 4 bars. The quality of Pregnanolone thus obtained is suitable for use in step a) of the process.

The invention will be further illustrated by the following examples which are not to be construed as limiting the invention itself.

Instruments, Methods and Experimental Conditions

NMR:
    NMR spectrometer JEOL 400 YH (400 MHz); Software JEOL Delta v5.1.1;
    Spectra recorded in $CDCl_3$.

MS:
    Instrument: DSQ-trace Thermofisher
    Sample introduction—direct exposure probe (dep)
    Chemical ionization (CI) with methane Methane pressure: 2.2 psi
Source temperature: 200° C.
HPLC:
Agilent 1100 Series Chromatography System; Agilent 1200 Series RID Detector, Model G1362/A
HPLC Method:
Chromatographic Conditions:

| Column: | Waters Sunfire C18, 4.6(ID) × 250 (L) mm, 5 μm |
|---|---|
| Flow rate: | 1 mL/min |
| Detector: | RI |
| Detector temperature: | 40° C. |
| Injection volume: | 50 μL |
| Sample injection concentration: | 1 mg/mL in methanol |
| Temperature: | 25° C. |
| Mobile phase: | acetonitrile/methanol/water = 65/5/30 (isocratic) |

TLC:
MERCK: TLC Silica Gel 60 F254 Aluminium sheets 20×20 cm, cod. 1.0554.0001.
TLC Detection Reagent:
Cerium phosphomolybdate: 25 g of phosphomolybdic acid and 10 g of cerium(IV) sulfate are dissolved in 600 mL of $H_2O$. 60 mL of 98% $H_2SO_4$ are added and brought to a volume of 1 L with $H_2O$. The TLC plate is impregnated with the solution and then heated until the products are detected.
XPRD:
X-ray diffractometry analysis was performed using a Bruker D2 Phaser diffractometer ($2^{nd}$ ed.) operating in Bragg-Brentano geometry and equipped with a 6-position rotary multisampler. The X-ray source used is a tube with a copper anode operated at 30 kV and 10 mA. The selected analytical wavelength is copper Kα radiation ($\lambda$=1.54184 Å) obtained by filtering the Kβ radiation through a nickel filter. The X-ray detector used is a LYNXEYE model solid-state linear detector. For the analysis, the samples were deposited on a flat monocrystalline silicon sample holder of the "zero-background" type. During the analysis, the sample was rotated at a speed of 60 rotations per minute. The analysis was carried out in the range 4-40° 2θ with increments of 0.016° and an acquisition time of 1.0 s for each increment. Visualization and processing of the diffractogram were performed using the Diffrac.EVA (Bruker) software.
DSC:
DSC analysis was performed using a Perkin Elmer Diamond differential scanning calorimeter. Before the analysis, the samples were encapsulated in aluminium crucibles. Heating of the sample and the reference were performed at a rate of 10° C./min. The thermogram analysis was performed using the Pyris Data Analysis software (Perkin Elmer).
IR:
FTIR spectra were acquired using a Thermo Nicolet 6700 spectrophotometer equipped with a Smart iTR model ATR accessory. 64 reading scans were performed for both the sample and the background, using a resolution of 4 $cm^{-1}$, and acquiring the background immediately before the sample. Display and processing of the FTIR spectrum were performed using the Omnic software (Thermo Nicolet).
Notes
The water used in the experimental descriptions is to be intended as commercial distilled water, unless otherwise indicated.
The organic solvents used in the experimental descriptions are to be intended of a "technical" grade, unless otherwise indicated.

The reagents and catalysts used in the experimental descriptions are to be intended of commercial quality, unless otherwise indicated.

Example 1

This example refers to the optional step 0) of the process of the invention, from Pregnenolone to Pregnanolone.

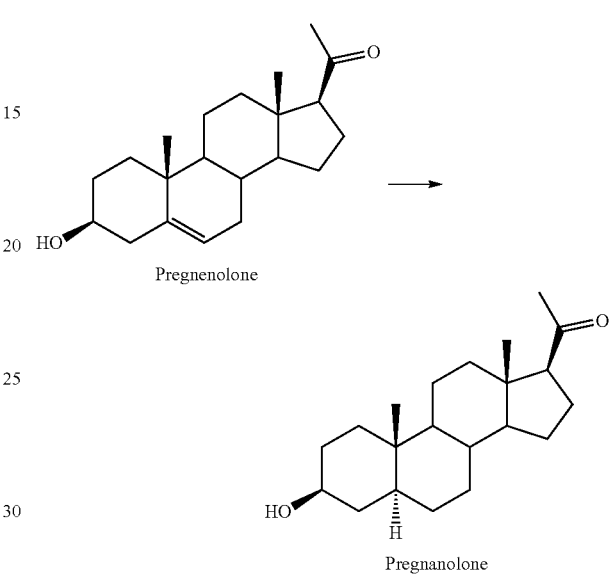

Pregnenolone

Pregnanolone

A hydrogenator is charged with 140 g of Pregnenolone dissolved in 4200 mL of tetrahydrofuran at 25° C. 7 g of 5% palladium on carbon are added and hydrogenation is conducted at 4 bar and 45° C. for 5 hours. The reaction is monitored by $^1$H-NMR.

Once the reaction is complete, the reaction mixture is cooled to 25° C. and filtered through a pad of dicalite washing with 1750 mL of tetrahydrofuran.

It is concentrated under reduced pressure at 45° C., eliminating 90% of the solvent.

The residue is taken up with 900 mL of methyl ethyl ketone and concentrated under reduced pressure at 45° C. until a residual volume equal to 560 mL is obtained.

The suspension is heated under reflux (80° C.) and subsequently cooled to 0° C. for 1 hour.

The solid is filtered washing with cold methyl ethyl ketone.

The solid is dried at 45° C. to a constant weight to obtain 133 g of a white solid.

$^1$H-NMR (400 MHz, $CDCl_3$): δ 3.62-3.56 (m, 1H); 2.52 (t, 1H, J=9.0 Hz); 2.22-2.12 (m, 1H); 2.11 (s, 3H); 2.00-0.90 (m, 21H); 0.81 (s, 3H); 0.72-0.63 (m, 1H); 0.60 (s, 3H).

Mass (CI): m/z=319 [$M^+$+1].

Example 2

This example refers to step a) of the process of the invention, from Pregnanolone to Pregnanolone 20,20' ethylene ketal.

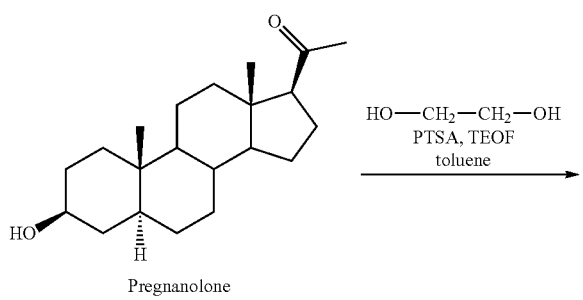

Pregnanolone

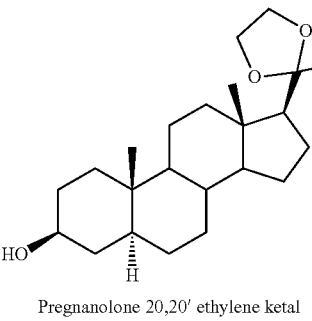

Pregnanolone 20,20' ethylene ketal

A flask under nitrogen is charged with 10 g of Pregnanolone dissolved in 170 mL of toluene at 25° C. The suspension is kept under stirring at 25° C. for 15 minutes and ethylene glycol (35.2 mL), triethylorthoformate (33.5 mL) and p-toluenesulfonic acid monohydrate (0.48 g) are added. The reaction mixture is heated under reflux (92° C.) for 2 hours. The reaction is monitored by TLC analysis.

Once the reaction is complete, it is cooled to 25° C. and the reaction mixture is poured into a 4% sodium bicarbonate solution (130 mL) pre-cooled at 5° C. The mixture is kept under stirring at 25° C. for 15 minutes, and toluene is distilled under reduced pressure at 45° C.

The residue is taken up with dichloromethane (200 mL) and the layers are separated.

The organic layer is washed with water to neutral pH.

It is concentrated under reduced pressure at 45° C. eliminating at least 90% of the solvent.

The residue is taken up with methanol (300 mL) and concentrated under reduced pressure at 45° C. until a residual volume equal to 40 mL is obtained.

The suspension is heated under reflux (65° C.) for 15 minutes, and subsequently cooled to 25° C. for 1 hour, and then to 0° C. for 1 hour.

The solid is filtered washing with pre-cooled methanol (10 mL).

The solid is dried under reduced pressure at 45° C. for 4 hours to obtain 10 g of white solid.

$^1$H-NMR (400 MHz, CDCl$_3$): δ 4.00-3.87 (m, 4H); 3.63-3.56 (m, 1H); 3.48 (d, 4H, J=5.6 Hz); 2.01 (dt, 1H, J=12.4/3.1 Hz); 2.04-0.83 (m, 22H); 1.29 (s, 3H); 0.81 (s, 3H); 0.75 (s, 3H); 0.65-0.63 (m, 1H).

Mass (CI): m/z=363 [M$^+$+1].

Following the same procedure, it is possible to recover the Pregnanolone ketal directly by filtration from the aqueous solution at the end of toluene distillation, avoiding the extraction with dichloromethane. From 50 g of Pregnanolone, after drying to a constant weight, 56 g of Pregnanolone 20,20' ethylene ketal of a quality suitable for continuation of the synthesis are obtained.

Example 3

This example refers to step b) of the process of the invention, from Pregnanolone 20,20' ethylene ketal to Pregnane-3,20-dione 20,20' ethylene ketal (Pregnanedione 20,20' ethylene ketal) carried out with TEMPO and a hypochlorite.

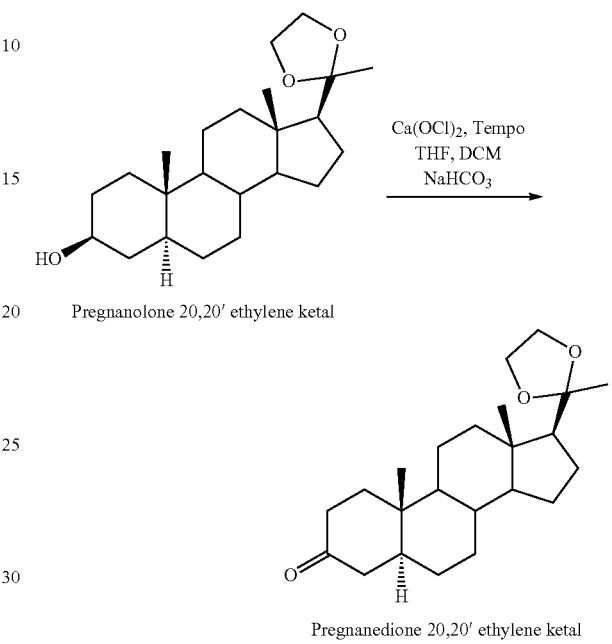

A flask under nitrogen is charged with 14 g of Pregnanolone 20,20' ethylene ketal, 170 mL of tetrahydrofuran, and the solution is concentrated under reduced pressure at 45° C., eliminating at least 90% of the solvent.

Dichloromethane (350 mL) and 10% sodium bicarbonate solution (280 mL) are added to the suspension.

The biphasic system is cooled to 10° C., TEMPO (0.4 g) is added, and the mixture is kept under stirring at 25° C. for 15 minutes. Calcium hypochlorite (6.02 g) is added, and the mixture is heated to 30° C. for 1 hour. The reaction is monitored by TLC analysis.

Once the reaction is complete, the reaction mixture is cooled to 25° C. and filtered through a pad of dicalite.

The layers are separated, and the organic layer is washed with a sodium thiosulfate solution and a sodium bicarbonate solution.

The organic layer is washed with 100 mL of water and concentrated under reduced pressure at 45° C. until a residual volume equal to 300 mL is obtained.

It is filtered through a pad of dicalite and concentrated under reduced pressure at 45° C. until a residual volume equal to 60 mL is obtained.

n-heptane (70 mL) is added to the solution, and the residual dichloromethane is distilled at ambient pressure at 43° C.

The suspension is kept under stirring at 25° C. for 2 hours and the solid is filtered washing with n-heptane (10 mL).

The solid is dried under reduced pressure at 50° C. for 4 hours to obtain 11.6 g of white solid.

$^1$H-NMR (400 MHz, CDCl$_3$): δ 4.01-3.87 (m, 4H); 2.36-0.75 (m, 23H); 1.29 (s, 3H); 1.01 (s, 3H); 0.78 (s, 3H).

Mass (CI): m/z=361 [M$^+$+1].

Example 4

This example refers to step b) of the process of the invention, from Pregnanolone 20,20' ethylene ketal to Pregnane-3,20-dione 20,20' ethylene ketal, carried out with with dimethylsulfoxide in the presence of the pyridine/sulfur trioxide complex (Py·SO₃; Parikh-Doering variant of Swern reaction).

A flask under nitrogen is charged with 1.0 g of Pregnanolone 20,20' ethylene ketal, dichloromethane (10 mL) and dimethylsulfoxide (2.1 mL). Triethylamine (1.79 mL) and Py·SO₃ (0.9 g) are added to the solution while keeping the temperature at 25° C. The reaction mixture is kept under stirring at 25° C. for 3 hours. The reaction is monitored by TLC analysis: incomplete disappearance of the initial reagent is observed. Triethylamine (200 µL) and Py·SO₃ (0.9 g) are added while keeping the temperature at 25° C. The reaction mixture is kept under stirring at 25° C. for 12 hours. The reaction is monitored by TLC analysis: reaction complete.

The reaction mixture is poured into water (50 mL) and dichloromethane (20 mL) is added.

The layers are separated, and the aqueous layer is re-extracted with dichloromethane (20 mL).

The organic layer is washed with water (2×10 mL) and with a saturated sodium chloride solution (2×10 mL).

The organic layer is concentrated under reduced pressure at 45° C. to obtain 0.9 g of Pregnane-3,20-dione 20,20' ethylene ketal.

Example 5

This example refers to step b) of the process of the invention, from Pregnanolone 20,20' ethylene ketal to Pregnane-3,20-dione 20,20' ethylene ketal, carried out with tetrapropylammonium perruthenate (TPAP) in the presence of N-methylmorpholine N-oxide (NMO).

A flask under nitrogen is charged with 1.0 g of Pregnanolone 20,20' ethylene ketal, NMO (0.32 g) and 4 Å molecular sieves. Dichloromethane (14 mL) and TPAP (0.05 g) are added while keeping the temperature at 25° C. The reaction mixture is kept under stirring at 25° C. for 3 hours. The reaction is monitored by TLC analysis: incomplete disappearance of the initial reagent is observed. NMO (0.16 g) and TPAP (0.03 g) are added, and the mixture is kept under stirring at 25° C. for 12 hours. The reaction is monitored by TLC analysis (reaction complete).

The reaction mixture is filtered through a pad of dicalite washing with dichloromethane (5 mL)

The organic layer is concentrated under reduced pressure at 45° C. to obtain 1.0 g of Pregnane-3,20-dione 20,20' ethylene ketal.

Example 6

This example refers to step b) of the process of the invention, from Pregnanolone 20,20' ethylene ketal to Pregnane-3,20-dione 20,20' ethylene ketal, carried out according to Swern's conditions.

A flask under nitrogen is charged with oxalyl chloride (388 µL) and dichloromethane (12.56 mL) at −78° C. A solution of dimethylsulfoxide (696 µL) in dichloromethane (1.25 mL) is slowly added, while keeping the temperature below −60° C. The reaction mixture is kept under stirring at −70° C. for 30 minutes. The solution of Pregnanolone 20,20' ethylene ketal (1.0 g) in dichloromethane (12.56 mL) is slowly added, while keeping the temperature below −60° C. The reaction mixture is kept under stirring at −70° C. for 30 minutes. Triethylamine (2.46 mL) is slowly added, while keeping the temperature below −60° C. The reaction mixture is kept under stirring at −70° C. for 30 minutes, and subsequently at 25° C. for 12 hours. The reaction is monitored by TLC analysis (reaction complete).

Water (8 mL) is poured into the reaction mixture and the layers are separated.

The aqueous layer is re-extracted with dichloromethane (2×10 mL).

The organic layer is washed with saturated sodium chloride solution (2×10 mL).

The organic layer is concentrated under reduced pressure at 45° C. to obtain 1.0 g of Pregnane-3,20-dione 20,20' ethylene ketal.

Example 7

This example refers to step b) of the process of the invention, from Pregnanolone 20,20' ethylene ketal to Pregnane-3,20-dione 20,20' ethylene ketal, carried out with Dess-Martin periodinane.

A flask is charged with 8 g of Pregnanolone 20,20' ethylene ketal solvated by methanol and dissolved in 160 mL of dichloromethane at 25° C. The solution is cooled to 5° C.

1,1,1-triacetoxy-1,1-dihydro-1,2-benziodoxol-3(1H)-one, also known as Dess-Martin periodinane, (11.24 g) is added. The suspension is kept under stirring at 25° C. for 1 hour. The reaction is monitored by TLC analysis.

Once the reaction is complete, a solution of sodium thiosulfate at 10% by weight in water (80 mL) is added. The biphasic system is kept under stirring for 30 minutes.

The layers are separated.

The organic layer is washed with saturated sodium bicarbonate solution (40 mL), with 10% sodium hydroxide solution (160 mL) and with water (350 mL) to neutral pH.

It is concentrated under reduced pressure at 45° C. to obtain 7.7 g of white solid.

¹H-NMR (400 MHz, CDCl₃) and Mass (CI) spectra coincide with those obtained in Example 3.

Example 8

This example refers to steps c) and d) of the process of the invention, from Pregnane-3,20-dione 20,20' ethylene ketal to Ganaxolone.

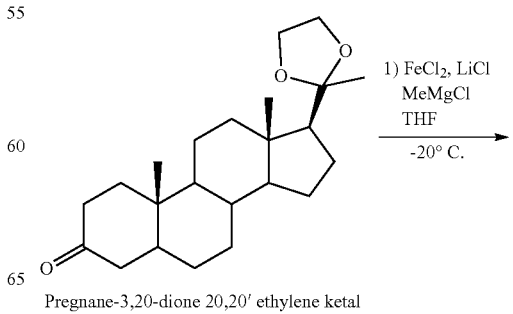

Pregnane-3,20-dione 20,20' ethylene ketal

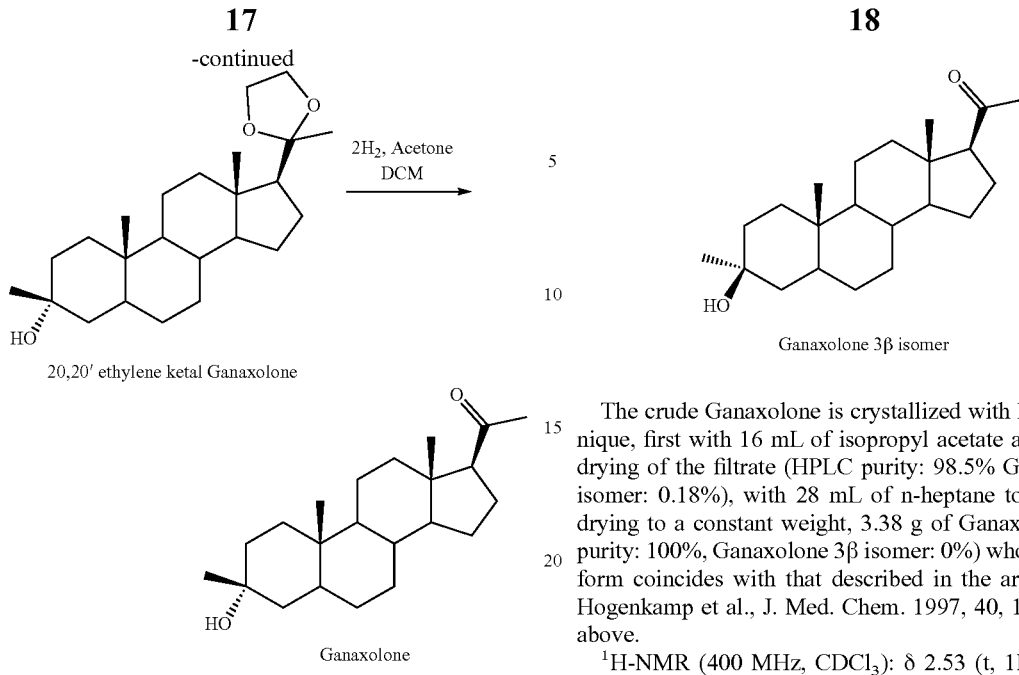

c): Addition of Grignard Reagent to Pregnane-3,20-Dione 20,20' Ethylene Ketal.

A flask under nitrogen is charged with 0.95 g of lithium chloride and 2.5 g of anhydrous iron trichloride at 25° C. The flask is cooled to 0° C. and 45 mL of tetrahydrofuran are added. The suspension is kept under stirring at 0° C. for 1 hour. The reaction mixture is cooled to −35° C. and a 3M solution of methylmagnesium chloride ($CH_3MgCl$) in tetrahydrofuran (21 mL) is slowly added, while keeping the temperature between −35<T<−30° C. 5 g of Pregnane-3,20-dione 20,20' ethylene ketal are slowly added, the temperature is brought to −20° C. and the suspension is kept under stirring at −20° C. for 4 hours. The reaction is monitored by TLC analysis (reaction complete)

A saturated ammonium chloride solution (150 mL) is added, and the biphasic system thus obtained is kept under stirring at 25° C. for 15 minutes.

The solvent is concentrated under reduced pressure at 45° C., the residue is taken up with isopropyl acetate (150 mL) and the biphasic system is filtered.

The layers are separated, and the organic layer is washed with a saturated sodium chloride solution.

It is concentrated under reduced pressure at 45° C. to obtain 5 g of solid (Ganaxolone ketal).

d): Deprotection

The solid is dissolved in 42 mL of dichloromethane (maximum water content of the solution=0.1% by weight) and iodine (35 mg) and acetone (11 mL) are added. The system is kept under stirring at 25° C. for 1 hour. The reaction is monitored by TLC analysis (complete reaction).

The reaction mixture is poured into a sodium thiosulfate solution at 10% by weight in water (40 mL) and stirred at 25° C. for 15 minutes.

The layers are separated, the aqueous layer is re-extracted with dichloromethane (10 mL) and the combined organic layers are washed with water (40 mL).

It is concentrated under reduced pressure at 45° C. for 4 h to obtain 4.5 g of crude Ganaxolone.

HPLC purity: 92%.

The product has a content of Ganaxolone 3β isomer, shown in the formula below, equal to 2.5%:

The crude Ganaxolone is crystallized with hot-cold technique, first with 16 mL of isopropyl acetate and then, after drying of the filtrate (HPLC purity: 98.5% Ganaxolone 3β isomer: 0.18%), with 28 mL of n-heptane to obtain, after drying to a constant weight, 3.38 g of Ganaxolone (HPLC purity: 100%, Ganaxolone 3β isomer: 0%) whose crystalline form coincides with that described in the article by D. J. Hogenkamp et al., J. Med. Chem. 1997, 40, 1, 61-72, cited above.

$^1$H-NMR (400 MHz, $CDCl_3$): δ 2.53 (t, 1H, J=9.0 Hz); 2.16-2.12 (m, 1H); 2.11 (s, 3H); 2.00 (dt, 1H, J=11.9/3.2 Hz); 1.67-0.83 (m, 21H); 1.20 (s, 3H); 0.75 (s, 3H); 0.60 (s, 3H).

Mass (CI): m/z=333 [M$^+$+1].

A sample of Ganaxolone 3β isomer was isolated by chromatographic purification (eluent: heptane/ethyl acetate, 8:2) for analytical purposes only, providing the following results:

$^1$H-NMR (400 MHz, $CDCl_3$): δ 2.52 (t, 1H, J=9.0 Hz); 2.17-2.13 (m, 1H); 2.11 (s, 3H); 2.00 (dt, 1H, J=11.4/3.2 Hz); 1.67-0.83 (m, 20H); 1.25 (s, 3H); 0.81 (s, 3H); 0.68-0.75 (m, 1H); 0.60 (s, 3H).

Mass (CI): m/z=333 [M$^+$+1].

Example 9 (Comparative)

This example refers to steps c) and d) of the process of the invention, from Pregnane-3,20-dione 20,20' ethylene ketal to Ganaxolone, wherein step c) is carried out under temperature conditions not of the invention.

c): Addition of Grignard Reagent to Pregnane-3,20-Dione 20,20' Ethylene Ketal.

A flask under nitrogen is charged with 0.2 g of lithium chloride and 0.5 g of anhydrous iron trichloride at 25° C. The flask is cooled to 0° C. and 9 mL of tetrahydrofuran are added. The suspension is kept under stirring at 0° C. for 1 hour. The reaction mixture is cooled and a 3M $CH_3MgCl$ solution in tetrahydrofuran (4.1 mL) is slowly added, while keeping the temperature between −10<T<−5° C. 1 g of Pregnane-3,20-dione 20,20' ethylene ketal is slowly added, and the suspension is kept under stirring at 0° C. for 2 hours. The reaction is monitored by TLC analysis (complete reaction).

A saturated ammonium chloride aqueous solution is added (10 mL) to the reaction mixture and the biphasic system is kept under stirring at 25° C. for 15 minutes.

The solvent is concentrated under reduced pressure at 45° C., the residue is taken up with isopropyl acetate (10 mL) and the biphasic system is filtered.

The layers are separated, and the aqueous layer is re-extracted with isopropyl acetate (10 mL).

The combined organic layers are washed with a saturated sodium chloride solution (10 mL).

It is concentrated under reduced pressure at 45° C. to obtain 1.21 g of residue (grey solid).

d): Deprotection

The solid is dissolved in 8 mL of dichloromethane (maximum water content of the solution=0.1% by weight) and iodine (7 mg) and acetone (2 mL) are added. The mixture is kept under stirring at 25° C. for 1 hour. The reaction is monitored by TLC analysis (complete reaction).

The reaction mixture is poured into a sodium thiosulfate solution at 10% by weight in water (10 mL) and kept under stirring at 25° C. for 15 minutes.

The layers are separated, the aqueous layer is re-extracted with dichloromethane (2.5 mL) and the combined organic layers are washed with water (40 mL).

The organic layer is concentrated under reduced pressure 45° C. for 4 hours to obtain 0.68 g of Ganaxolone (white solid).

HPLC purity: 71%

Ganaxolone 3β isomer: 28.7%.

Example 10 (Comparative)

This example refers to steps c) and d) of the process of the invention, from Pregnane-3,20-dione 20,20' ethylene ketal to Ganaxolone, wherein step c) is carried out under temperature conditions not of the invention.

c): Addition of Grignard Reagent to Pregnane-3,20-Dione 20,20' Ethylene Ketal.

A flask under nitrogen is charged with 0.2 g of lithium chloride and 0.5 g of anhydrous iron trichloride at 25° C. The flask is cooled to 0° C. and 9 mL of tetrahydrofuran are added. The suspension is kept under stirring at 0° C. for 1 hour. The reaction mixture is cooled down to −65° C. and a 3M CH$_3$MgCl solution in tetrahydrofuran (4.1 mL) is slowly added, while keeping the temperature between −65<T<−60° C. Pregnane-3,20-dione 20,20' ethylene ketal (1 g) is slowly added, while keeping the temperature between −65<T<−60° C. After 2 h the reaction is monitored by TLC analysis (incomplete reaction). 2.8 mL of 3M CH$_3$MgCl solution are then added, while keeping the reaction temperature between −65<T<−60° C. The reaction is monitored by TLC analysis (complete reaction) after 1 h.

A saturated ammonium chloride aqueous solution (10 mL) is added, and the biphasic system is kept under stirring at 25° C. for 15 minutes.

The solvent is concentrated under reduced pressure at 45° C., the residue is taken up with isopropyl acetate (10 mL) and the biphasic system is filtered.

The layers are separated, the aqueous layer is re-extracted with isopropyl acetate (10 mL), and the combined organic layers are washed with a saturated sodium chloride aqueous solution.

They are concentrated under reduced pressure at 45° C. to obtain 0.82 g of white solid.

d): Deprotection

The solid is dissolved in 6.5 mL of dichloromethane (maximum water content of the solution=0.1% by weight) and iodine (5.6 mg) and acetone (1.7 mL) are added. The mixture is kept under stirring at 25° C. for 1 hour. The reaction is monitored by TLC analysis (complete reaction).

The reaction mixture is poured into a sodium thiosulfate solution at 10% by weight in water (10 mL) and stirred at 25° C. for 15 minutes.

The layers are separated, the aqueous layer is re-extracted with dichloromethane (5 mL) and the combined organic layers are washed with water (10 mL).

It is concentrated under reduced pressure at 45° C. for 4 h to obtain 0.75 g of Ganaxolone (yellow solid).

HPLC purity: 88%

Ganaxolone 3β isomer: 8.5%.

Example 11 (Comparative)

This example refers to steps c) and d) of the process of the invention, from Pregnane-3,20-dione 20,20' ethylene ketal to Ganaxolone, wherein step c) is carried out without using lithium and iron(III) salts and with temperature conditions not of the invention.

c): Addition of Grignard Reagent to Pregnane-3,20-Dione 20,20' Ethylene Ketal.

A flask under nitrogen is charged with 1 g of Pregnane-3,20-dione 20,20' ethylene ketal dissolved in 9 mL of tetrahydrofuran at 25° C. The solution is cooled to 0° C. and a 3M CH$_3$MgCl solution in tetrahydrofuran (1.75 mL) is slowly added. Once the addition is complete, the solution is brought to 25° C. and a second aliquot of 3M CH$_3$MgCl solution in tetrahydrofuran (0.85 mL) is slowly added. The solution is kept under stirring at 25° C. for 2 hours. The reaction is monitored by TLC analysis (incomplete reaction). Additional 0.85 mL of 3M CH$_3$MgCl solution in tetrahydrofuran are added and the solution is kept under stirring at 25° C. for 1 hour. The reaction is monitored by TLC analysis (complete reaction).

A saturated ammonium chloride aqueous solution (10 mL) is added, and the biphasic system is kept under stirring at 25° C. for 15 minutes.

The layers are separated, the aqueous layer is re-extracted with isopropyl acetate (10 mL) and the combined organic layers are washed with a saturated sodium chloride solution.

They are concentrated under reduced pressure at 45° C. to obtain 1.1 g of white solid.

d): Deprotection

The solid is dissolved in 8.4 mL of dichloromethane (maximum water content of the solution=0.1% by weight) and iodine (7.1 mg) and acetone (2.1 mL) are added. The mixture is kept under stirring at 25° C. for 1 hour. The reaction is monitored by TLC analysis (complete reaction).

The reaction mixture is poured into a sodium thiosulfate solution at 10% by weight in water (10 mL) and stirred at 25° C. for 15 minutes.

The layers are separated, the aqueous layer is re-extracted with dichloromethane (5 mL) and the combined organic layers are washed with water (10 mL).

They are concentrated under reduced pressure at 45° C. for 4 h to obtain 0.92 g of Ganaxolone (yellow solid).

HPLC purity: 56%

Ganaxolone 3β isomer: 35.5%.

Example 12 (Comparative)

This example refers to steps c) and d) of the process of the invention, from Pregnane-3,20-dione 20,20' ethylene ketal to Ganaxolone, wherein step c) is carried out without using lithium and iron(III) salts.

c): Addition of Grignard Reagent to Pregnane-3,20-Dione 20,20' Ethylene Ketal.

A flask under nitrogen is charged with 9 mL di tetrahydrofuran. The solvent is cooled to −35° C. and a 3M CH$_3$MgCl solution in tetrahydrofuran (4.1 mL) is slowly added, while keeping the temperature between −35<T<−30° C. 1 g of Pregnane-3,20-dione 20,20' ethylene ketal is slowly added, the temperature is brought to −20° C. and the suspension is kept under stirring at −20° C. The reaction is monitored by TLC analysis after 2 h (largely incomplete reaction). The reaction mixture is cooled to −35° C. and 3M CH₃MgCl in tetrahydrofuran (0.8 mL) is slowly added, while keeping the temperature between −35<T<−30° C. The temperature is brought to −20° C. and the suspension is kept under stirring at −20° C. for 2 hours. The reaction is monitored by TLC analysis (complete reaction).

A saturated ammonium chloride solution (10 mL) is added, and the biphasic system is kept under stirring at 25° C. for 15 minutes.

The layers are separated, the aqueous layer is re-extracted with isopropyl acetate (10 mL) and the combined organic layers are washed with a saturated sodium chloride solution.

They are concentrated under reduced pressure at 45° C. to obtain 1.1 g of white solid.

d): Deprotection

The solid is dissolved in 8.4 mL of dichloromethane (maximum water content of the solution=0.1% by weight) and iodine (7.1 mg) and acetone (2.1 mL) are added. The mixture is kept under stirring at 25° C. for 1 hour. The reaction is monitored by TLC analysis (complete reaction).

The reaction mixture is poured into a sodium thiosulfate solution at 10% by weight in water (10 mL) and stirred at 25° C. for 15 minutes.

The layers are separated, the aqueous layer is re-extracted with dichloromethane (5 mL) and the combined organic layers are washed with water (10 mL).

They are concentrated under reduced pressure at 45° C. for 4 h to obtain 0.87 g of Ganaxolone (white solid).

HPLC purity: 53%
Ganaxolone 3β isomer: 41%.

Example 13

This example illustrates Ganaxolone epimerization in the presence of acids.

A flask is charged with 100 mg of Ganaxolone and 2.5 mL of tetrahydrofuran. 1.9 mL of 2M hydrochloric acid are added to the solution, and it is heated under reflux (67° C.) for 16 hours.

The reaction mixture is cooled to 25° C. and the solvent is concentrated under reduced pressure at 45° C.

The residue is taken up with dichloromethane (3 mL) and water (2 mL).

The layers are separated, and the organic layer is washed with water to a neutral pH.

It is concentrated under reduced pressure at 45° C. and the product is purified by chromatographic column (eluent: heptane/ethyl acetate 8/2).

¹H-NMR analysis of the chromatographed product in CDCl₃ allowed to identify the 17a epimer that resulted to be present in an amount equal to 8% with respect to Ganaxolone, as calculated based on the signal of the proton in position 17, at 2.78 ppm (17α) and 2.56 ppm (17β, Ganaxolone), respectively.

Example 14

This example illustrates Ganaxolone epimerization in the presence of bases.

A flask is charged with 100 mg of Ganaxolone and 4.4 mL of tetrahydrofuran. 72 mg of sodium hydroxide are added to the solution, and it is heated under reflux (65° C.) for 16 hours.

The reaction mixture is cooled to 25° C. and the solvent is concentrated under reduced pressure at 45° C. The residue is taken up with dichloromethane (4 mL) and water (4 mL).

The layers are separated, and the organic layer is washed with water to a neutral pH.

It is concentrated under reduced pressure at 45° C. and the product is purified by chromatographic column (eluent: heptane/ethyl acetate 8/2).

¹H-NMR analysis of the chromatographed product in CDCl₃ allowed to identify the 17α epimer that resulted to be present in an amount equal to 12% with respect to Ganaxolone, as calculated based on the signal of the proton in position 17, at 2.78 ppm (17α) and 2.56 ppm (17β, Ganaxolone), respectively.

The invention claimed is:

1. A process for preparing (3α,5α)-3-hydroxy-3-methyl-pregnan-20-one (Ganaxolone), comprising the following steps:

a) reaction of the compound (3β)-3-hydroxy-pregnan-20-one (Pregnanolone) with a glycol under acid catalysis conditions to obtain Pregnanolone 20,20' ketal:

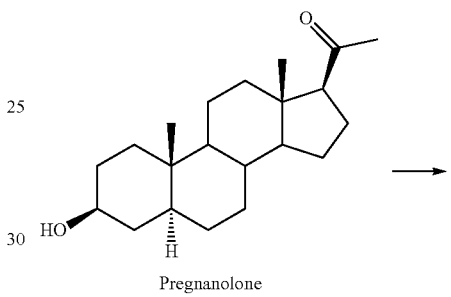

Pregnanolone

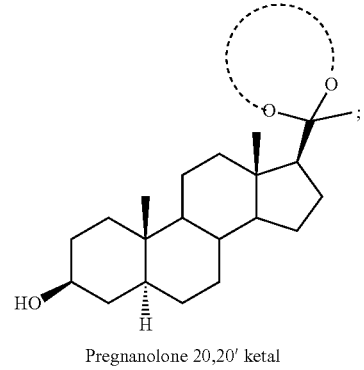

Pregnanolone 20,20' ketal b) oxidation of Pregnanolone 20,20' ketal to obtain the corresponding Pregnane-3,20-dione 20,20' ketal (Pregnanedione 20,20' ketal):

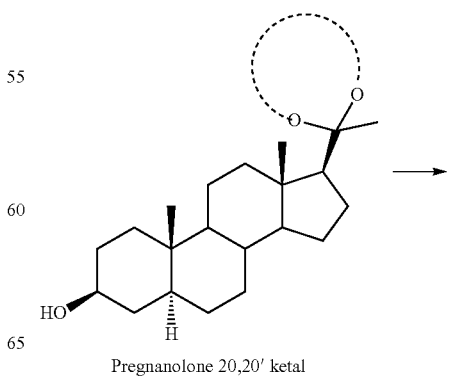

Pregnanolone 20,20' ketal c) reaction of Pregnane-3,20-dione 20,20' ketal with a methylmagnesium halide Grignard reagent, CH₃MgX, to form (3α,5α)-3-hydroxy-3-methyl-pregnan-20-one 20,20' ketal (Ganaxolone 20,20' ketal):

wherein the reaction takes place at a temperature between −35° C. and −15° C., X denotes a halogen atom selected from chlorine and bromine, and the reaction takes place in the presence of lithium and iron (III) salts with X anion; and d) deprotection of Ganaxolone 20,20' ketal with iodine in a neutral environment to form Ganaxolone:

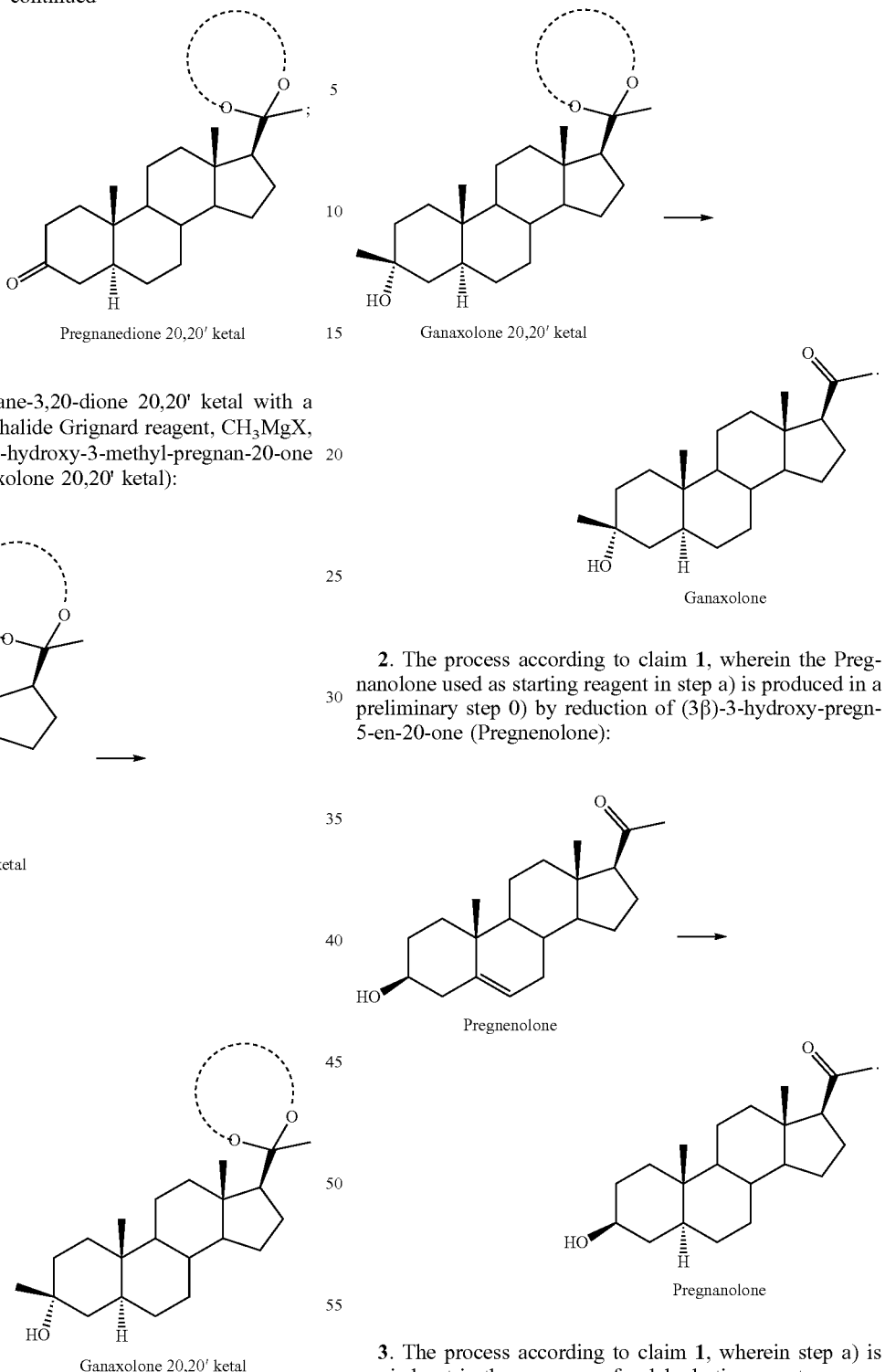

2. The process according to claim 1, wherein the Pregnanolone used as starting reagent in step a) is produced in a preliminary step 0) by reduction of (3β)-3-hydroxy-pregn-5-en-20-one (Pregnenolone):

3. The process according to claim 1, wherein step a) is carried out in the presence of a dehydrating agent.

4. The process according to claim 3, wherein step a) is carried out with a glycol selected from ethylene glycol, 1,3-propylene glycol and 2,2-dimethylpropylene glycol, with an acid catalyst selected from hydrochloric acid, fumaric acid, oxalic acid, phthalic acid, para-toluenesulfonic acid (PTSA), pyridinium hydrochloride, pyridinium tosylate (PPTS) and Amberlyst 15®, and with a dehydrating agent selected from triethylorthoformate (TEOF), trimethylorthoformate (TMOF) and molecular sieves.

5. The process according to claim 3, wherein the glycol is ethylene glycol, the acid catalyst is para-toluenesulfonic acid (PTSA), and the dehydrating agent is triethylorthoformate.

6. The process according to claim 1, wherein the oxidation of step b) is carried out with a system selected from:
chromium (VI) compounds;
an inorganic hypochlorite in the presence of 2,2,6,6-tetramethylpiperidin-1-oxyl or a derivative thereof selected from 4-hydroxy-2,2,6,6-tetramethylpiperidin-1-oxyl, 4-methoxy-2,2,6,6-tetramethylpiperidin-1-oxyl and 4-benzyloxy-2,2,6,6-tetramethylpiperidin-1-oxyl;
a ruthenium compound selected from ruthenium tetroxide and ruthenium trichloride in the presence of sodium hypochlorite;
tetrapropylammonium perruthenate in the presence of N-methylmorpholine N-oxide;
potassium peroxymonosulfate $KHSO_5$;
dimethylsulfoxide used under Swern's conditions; and
Dess-Martin periodinane.

7. The process according to claim 1, wherein in step c) a molar ratio among lithium halide, iron trihalide and Grignard reagent is 1.6/1.1/4.4.

8. The process according to claim 1, wherein step c) takes place using methylmagnesium chloride ($CH_3MgCl$) in the presence of lithium chloride (LiCl) and anhydrous iron trichloride ($FeCl_3$) and in a solvent of tetrahydrofuran.

9. The process according to claim 1, wherein step d) is carried out by operating with an anhydrous solvent.

10. The process according to claim 9, wherein a solvent is selected from acetone and a mixture of dichloromethane and acetone, and step d) is carried out by operating at a temperature between −5° C. and the reaction mixture reflux temperature.

11. The process according to claim 10, wherein iodine is used in an amount equal to 1% by mole with respect to 20,20' Ganaxolone ketal.

12. The process according to claim 10, wherein the temperature is between 15 and 35° C.

* * * * *